United States Patent
Hogdal

(10) Patent No.: US 9,410,809 B2
(45) Date of Patent: Aug. 9, 2016

(54) APPLYING A CORRECT FACTOR DERIVATIVE METHOD FOR DETERMINING AN ORIENTATION OF A PORTABLE ELECTRONIC DEVICE BASED ON SENSE GRAVITATION COMPONENT LINEAR ACCELERATE FILTER DATA OBTAINED

(75) Inventor: Greg Hogdal, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1025 days.

(21) Appl. No.: 13/329,131

(22) Filed: Dec. 16, 2011

(65) Prior Publication Data

US 2013/0158928 A1   Jun. 20, 2013

(51) Int. Cl.
| | |
|---|---|
| *G01C 21/00* | (2006.01) |
| *G01C 21/18* | (2006.01) |
| *G01C 21/06* | (2006.01) |
| *G01C 21/16* | (2006.01) |
| *G01C 21/20* | (2006.01) |
| G01C 21/08 | (2006.01) |
| G01C 21/14 | (2006.01) |
| G01C 21/04 | (2006.01) |
| G01C 21/10 | (2006.01) |

(52) U.S. Cl.
CPC .......... *G01C 21/18* (2013.01); *G01C 21/06* (2013.01); *G01C 21/16* (2013.01); *G01C 21/165* (2013.01); *G01C 21/20* (2013.01); G01C 21/00 (2013.01); G01C 21/04 (2013.01); G01C 21/08 (2013.01); G01C 21/10 (2013.01); G01C 21/14 (2013.01)

(58) Field of Classification Search
CPC ..... G01P 15/08; G01P 15/105; G01P 15/135; G01P 1/023; G01P 1/127; G01C 21/00; G01C 21/04; G01C 21/06; G01C 21/08; G01C 21/10; G01C 21/14; G01C 21/16; G01C 21/165; G01C 21/18; G01C 21/20
USPC .............................................. 702/104; 73/1.38
See application file for complete search history.

(56) References Cited

U.S. PATENT DOCUMENTS

| | | | |
|---|---|---|---|
| 6,061,021 | A | 5/2000 | Zibell |
| 6,697,736 | B2 | 2/2004 | Lin |
| 7,907,838 | B2 | 3/2011 | Nasiri et al. |
| 8,000,849 | B2 * | 8/2011 | Reich ............................... 701/14 |
| 8,010,308 | B1 * | 8/2011 | Churchill ...................... 702/104 |

(Continued)

OTHER PUBLICATIONS

Portable Absolute Orientation Estimation Device with Wireless Network under Accelerated Situation, IEEE 2004, Harada et al.*

(Continued)

*Primary Examiner* — John Breene
*Assistant Examiner* — Lynda Dinh
(74) *Attorney, Agent, or Firm* — Judy Yoo; Micky Minhas

(57) ABSTRACT

A method for determining an orientation of a portable or mobile electronic device includes determining an orientation of the device using at least a first inertial motion sensor (e.g., a gyroscope) with which the portable electronic device is equipped. A correction factor is provided to the orientation of the electronic device using a feedback control signal based on motion data obtained from at least a second inertial motion sensor (e.g. an accelerometer) to reduce drift in motion data obtained from the first inertial sensor. Responsive to a loss of valid motion data from the first inertial motion sensor, a rate at which the correction factor is provided to the orientation of the portable electronic device is increased.

19 Claims, 4 Drawing Sheets

(56) References Cited

U.S. PATENT DOCUMENTS

| | | |
|---|---|---|
| 8,351,773 B2 * | 1/2013 | Nasiri et al. ............... 396/55 |
| 2006/0287824 A1 | 12/2006 | Lin |
| 2007/0213889 A1 | 9/2007 | Parra Carque |
| 2007/0219744 A1 | 9/2007 | Kolen |
| 2007/0288414 A1 | 12/2007 | Barajas et al. |
| 2009/0265671 A1 | 10/2009 | Sachs et al. |
| 2011/0153123 A1 | 6/2011 | Thomas et al. |
| 2011/0163955 A1 | 7/2011 | Nasiri et al. |
| 2011/0215952 A1 | 9/2011 | Aria et al. |

OTHER PUBLICATIONS

Rios, et al., "Fusion Filter Algorithm Enhancements for a MEMS GPS/IMU", Retrieved at <<http://www.xbow.com/pdf/Fusion_Filter_Algorithm.pdf>>, National Technical Meeting of the Institute of Navigation, Jan. 28-30, 2002, pp. 126-137.

Premerlani, et al., "Direction Cosine Matrix IMU: Theory", Retrieved at <<http://gentlenav.googlecode.com/files/DCMDraft2.pdf>>, May 17, 2009, pp. 1-30.

Stelian-Florin Persa, "Sensor Fusion in Head Pose Tracking for Augmented Reality", Ubiquitous Communications (UBICOM), Copyright © 2006, 184 pages.

* cited by examiner

APPLYING A CORRECT FACTOR DERIVATIVE METHOD FOR DETERMINING AN ORIENTATION OF A PORTABLE ELECTRONIC DEVICE BASED ON SENSE GRAVITATION COMPONENT LINEAR ACCELERATE FILTER DATA OBTAINED

BACKGROUND

Portable or mobile electronic devices are used in a wide variety of applications and environments. The ubiquity of such devices as mobile phones, digital cameras, personal digital assistants (PDAs) handheld music and media players, portable video game devices and controllers, mobile internet devices (MIDs), personal navigation devices (PNDs), and other portable devices attest to the popularity and desire for these types of devices. Motion sensors, such as inertial sensors like accelerometers, gyroscopes, can be used in handheld electronic devices. For instance, accelerometers can be used for measuring acceleration including gravity, and gyroscopes can be used for measuring angular velocity of a portable electronic device. This information can be used to determine the spatial orientation and position of the device. In addition to inertial sensors, portable electronic devices also may be equipped with other types of sensors such as a magnetometer, for instance, which can be used as a compass, and GPS, which can be used to determine the device's position on Earth.

Many applications could benefit from the accurate determination of the spatial orientation and position of portable electronic devices. For instance, some portable device may use the orientation or relative motion of the device as a source of user input. Video game console controllers, for example, may use accelerometers to detect motion of the hand controller that is used to provide input to a game. Other game controllers may be used as a three dimensional gesture input device (e.g., a virtual golf club). Other applications that may use such spatial information include augmented reality applications, which can provide real-time visualization with respect to the physical position and orientation of the portable device. In yet another application, image stabilization is often a significant feature in even low- or mid-end digital cameras, where lens or image sensors are shifted to compensate for hand jittering measured by a gyroscope.

SUMMARY

In one implementation, a gyroscope is used as the primary source of data to obtain the orientation of a portable electronic device. Advantages of this approach include the rapid response and low noise that is found in typical gyroscopes. However, because of drift in the data and the occasional loss of valid gyroscope data, the instantaneous orientation data obtained from the gyroscope is supplemented by a periodic correction factor using data obtained from an accelerometer and possibly a magnetometer (if available). The periodic correction may be applied using a feedback control mechanism such as a proportional-integral-derivative (PID) feedback control mechanism. In one particular implementation, the proportional and integral responses of the PID control mechanism are employed, but not the derivative response. In another particular implementation, only the proportional response of the PID control mechanism is employed.

In one implementation, the PID control mechanism may enter a fast correction mode when valid gyroscope data is unavailable. In this mode the proportional response can be increased and the integral response suppressed for a short period of time so that it responds more quickly. In this way the orientation can be primarily tracked using the accelerometer and magnetometer. Once the gyroscope data again becomes available, the PID control mechanism can exit the fast correction mode.

In other implementations the amount of low pass filtering that the accelerometer data undergoes to remove noise may be varied because a lag is introduced to the accelerometer data which increases with increased filtering. Since lag becomes more problematic as the electronic device undergoes more rapid rotational motion, the amount of filtering performed on the accelerometer data is decreased as the rotational speed as measured by the gyroscope increases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
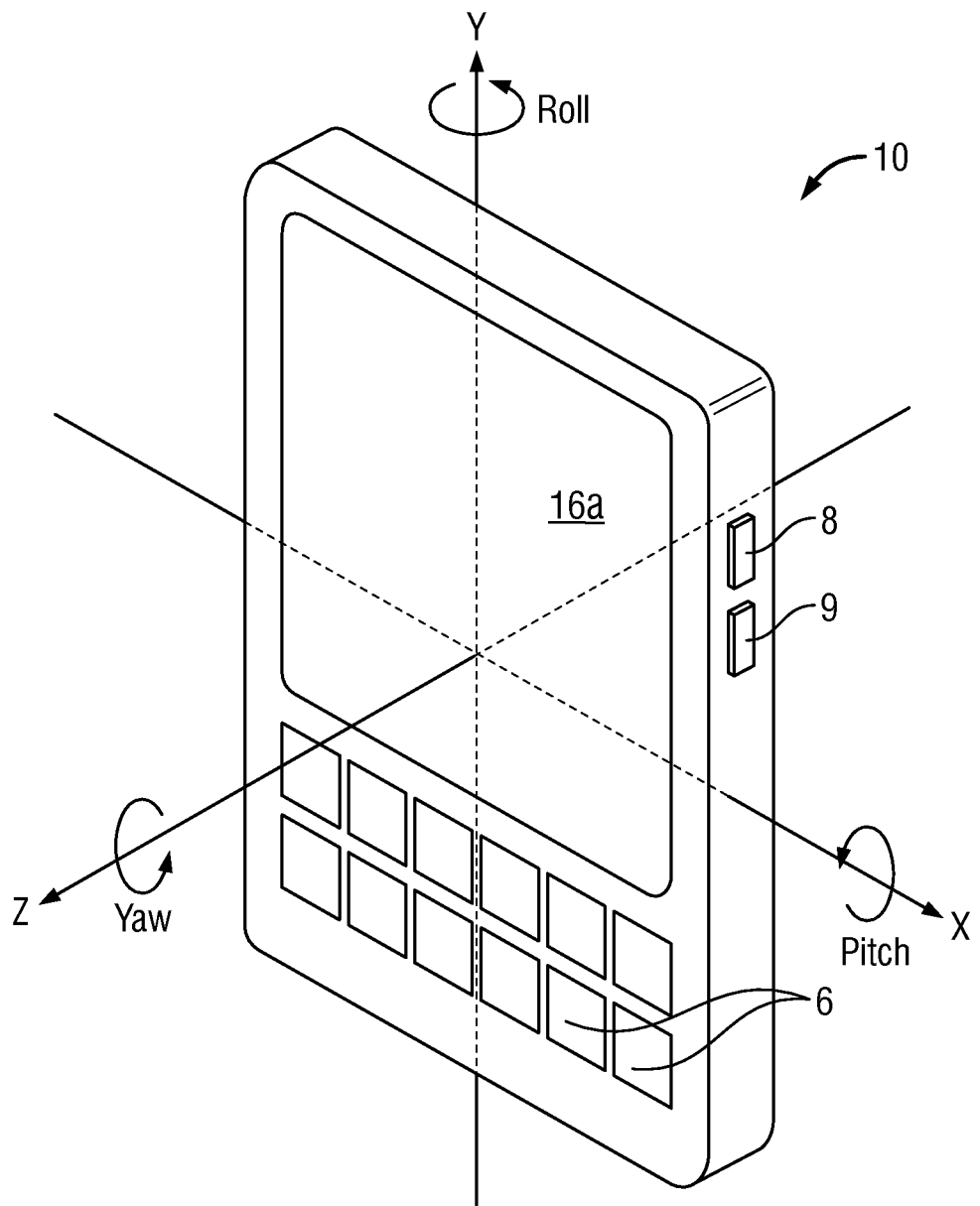
FIG. 1 is a perspective view of one example of a portable electronic device.

FIG. 1 is a perspective view of one example of a portable electronic device 10. The device 10 can be held in one or more hands of a user to be operated, and can include a variety of different functions, as described below. In this example the device 10 includes a display screen 16a and physical buttons 6 as well as buttons 8 and 9 on one or both sides of the device 10. Other embodiments of devices can be used, and can include different and/or additional input and output devices, as described below with respect to FIG. 2.

The device 10 can be moved by the user in space, and this movement is detected by motion sensors of the device as detailed below. As referred to herein, rotation of the device 10 can include pitch, roll, and yaw about the various rotational axes, as shown in FIG. 1. These axes can be defined differently in other embodiments. Furthermore, linear motions can be made along the linear axes x, y and z. Furthermore, these axes can be defined at various different positions on the device (for example translated or rotated with respect to the axes shown in FIG. 1, or otherwise transposed into any other coordinate system (whether rectangular, polar, or otherwise)), as appropriate for the hardware and software used by the device 10.

Figure 2:
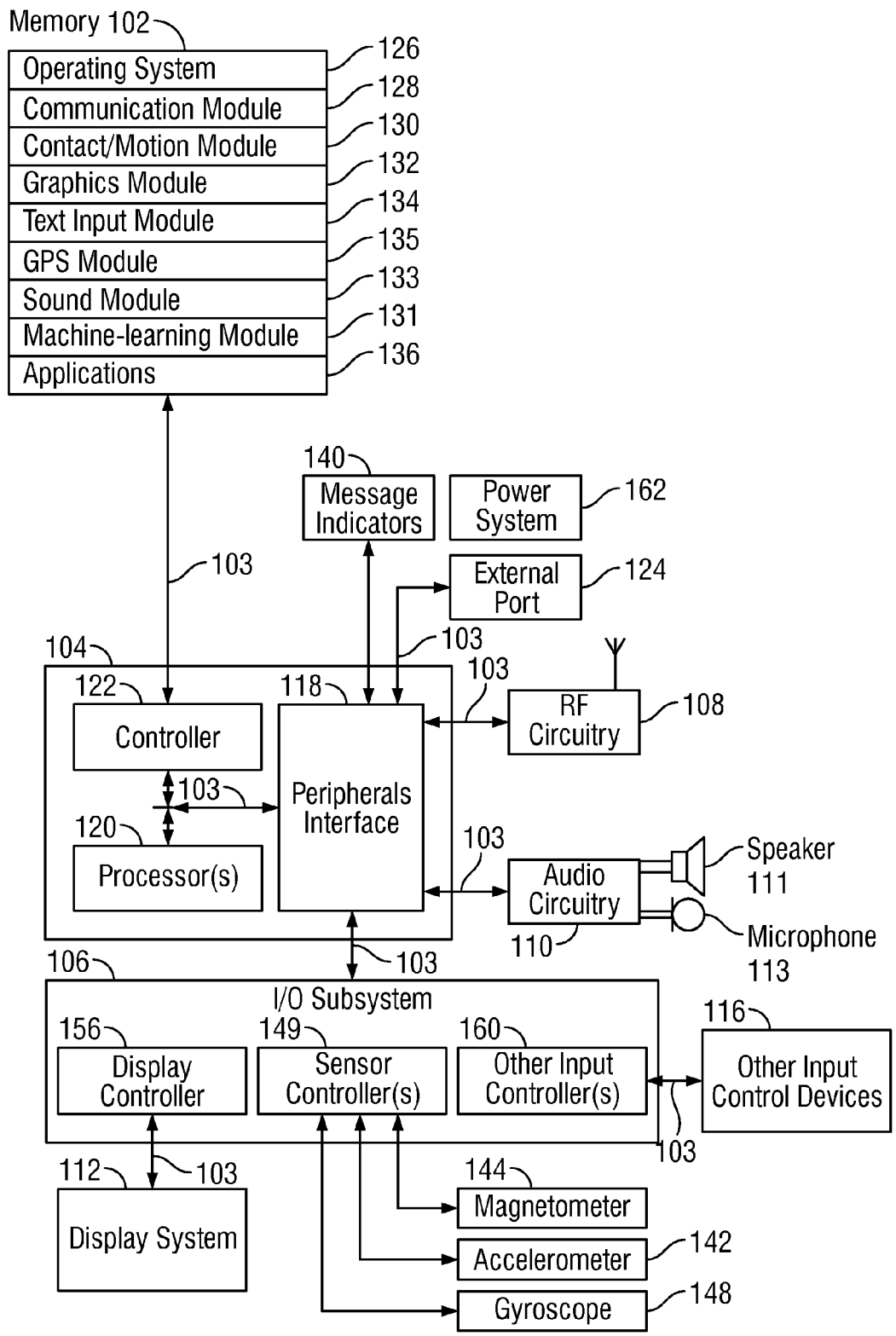
FIG. 2 is a block diagram illustrating one example of a portable electronic device such as the device shown in FIG. 1.

FIG. 2 is a block diagram illustrating one example of a portable electronic device such as the device 10 shown in FIG. 1. In some examples the device is a mobile communications device such as a wireless telephone that also contains other functions, such as FDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. It may also support applications that make use of data concerning the spatial orientation of the device, including but not limited to frames, augmented reality applications and the like. While the example in FIG. 1 is depicted as a mobile communications device, the computing device more generally may by any of a wide variety of different devices such as a laptop computer, a tablet computer, a smart phone and a netbook, for example.

The device 100 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, display system 103, an input/output (I/O) subsystem 106, other input or control devices 116, and an external port 124. These components may communicate over one or more communication buses or signal lines. Along with the input or control devices 116, the speaker 111, microphone 113 and display system 103 form a user interface through which a user can enter and receive various types of information and can communicate with other individuals over communication networks using RF circuitry 108.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the processor 120 and the peripherals interface 118, may be controlled by the memory controller 122. The peripherals interface 118 couples the input and output peripherals of the device to the processor 120 and memory unit 102. The one or more processors 120 run or execute various software programs and/or sets of instructions stored in memory unit 102 to perform various functions for the device 100 and to process data. In some examples the peripherals interface 118, the processor 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11a and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 form a part of the user interface provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112, sensor controller 149 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g. push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals front/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes one or more environmental sensors, which are in communication with peripherals interface 118 via sensor controllers 149. Such sensors may be used to capture the value of various environmental parameters and in this example, include two inertial sensors (a gyroscope 148 and accelerometer 142) and an optional magnetometer 144.

The device 100 also includes a power system 162 for powering the various components. The power system 162 may include a portable power supply (e.g., battery) and components used to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a machine-learning module 131, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module (or set of instructions) 128 facilitates communication with other devices over one or more external ports 124 and also includes various software components for handling data received, by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module (or set of instructions) 134, which may be a component of graphics module 132, provides soft keyboards for entering text in various applications (e.g., e mail 140, IM 141, blogging 142, and any other application that needs text input).

The GPS module 135 determines the location of the device and provides this information for use in various applications (e.g., applications that provide location-based services such as weather widgets, local yellow page widgets, and map/navigation widgets). It should be noted that if such applications are employed and if as a result user information and location information is collected, such information will only be collected and stored after notice has been provided to the user that the collection of personal information may occur, for example, when signing up to use a location-based service. The notice will also indicate that this information will not be shared with third parties, other than as may be needed to maintain or enhance the quality of the service that is being provided. Other policies that are intended to protect the user's privacy and enhance the quality of the user experience may also be employed. Once the user is informed as to the terms of service, the user will be given an opportunity to consent to the terms of service.

The message indicator control module 136 implements the functionality described herein to adjust a characteristic of one or more message indicators in response to the ambient audio level in the device's local environment. The ambient audio level may be determined by the measuring the audio level with the microphone 113 or another sensor dedicated to this purpose. Additional functionality and implementations of the message indicator control module 136 will be discussed below.

The message indicators employed by the communication device 100 may include the speaker 111, display screen 112 and/or other message indicators 140 such a dedicated ringer and a haptic feedback mechanism. If a speaker or ringer is employed as message indicator, its characteristic that may be adjusted includes its volume level, for example. If a display is employed as a message indicator, it characteristic that may be adjusted includes its brightness, color scheme, and/or graphics scheme. A haptic feedback mechanism is arranged to provide tactile feedback to a user of the communication device, in this case, for example, the haptic interface may be employed to vibrate mobile communication device 100 in different was when different types of messages are received.

The applications 138 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets. As described above, one or more of the applications may also employ spatial orientation data.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

It should be appreciated that the device 100 is only one example of a mobile communications device 100 and that the device 100 may have more or fewer components than shown, may combine two or more components, or a may have a different configuration or arrangement of components. The various components shown in FIG. 1 may be implemented in hardware, software or a combination of hardware and software, including one or more signal processing and/or application specific integrated circuits.

As mentioned above, in one implementation the inertial sensors include one or more rotational motion sensors such as gyroscope 148 and one or more linear motion sensors such as accelerometers 142. Gyroscopes 148 can sense or measure the angular velocity of the device 10 housing the gyroscopes 148. That is, gyroscopes output angular velocity in device coordinates. Gyroscopes generally have very good precision (e.g., 16 bit) and quality (e.g., very low noise, very low latency). Gyroscopes having from one to three axes may be used, depending on the motion that is desired to be sensed in a particular embodiment, with a three-axis gyroscope being typical. Some gyroscopes may be dynamically activated or deactivated, for example to control power usage or adapt to motion processing needs. Some gyroscopes may have variable sensitivity or gain. The more sensitive the gyroscope, the narrower its useful operating range and vice-versa.

The angular velocity of the portable electronic device obtained from the gyroscope can be integrated to obtain the relative angular position of the device at any given time. This integration eventually produces a drift in the data due to approximations arising from discrete sampling (the faster the better), offset error (any constant offset can be calibrated out), noise (typically very low), quantization, rounding of calculations, gain error (which is generally minimized by a factory calibration), saturation (reaching the maximum readable rotation rate of the gyroscope), etc. Given the overall quality of the gyroscope signal, this drift may be relatively small, but accumulates over time up to a few degrees per minutes), except in the case of saturation, when no data is available.

Because of its rapid response time and low noise, the gyroscope may be used as the primary or sole source of relative orientation data. However, because of its drift, among other problems, the gyroscope may be supplemented with additional sources of motion data obtained from the other sensors.

The accelerometer 142 can sense or measure the linear acceleration of the device 10 (or portion thereof) housing the accelerometer 142. An accelerometer operates by measuring the deflection of a small mass suspended by springs. The natural frequencies of the dynamics of the accelerometer are generally high and thus it responds quickly. The accelerometer outputs the sum of the linear acceleration in device coordinates and tilt due to gravity. That is, an accelerometer does not distinguish between gravity and any additional acceleration of the device above and beyond gravity. From one to three axis accelerometers can typically be provided, depending on the motion that is desired to be sensed in a particular embodiment. Some accelerometers may be dynamically activated or deactivated, for example to control power usage or adapt to motion processing needs.

The magnetometer 144 measures the magnetic intensity experienced by the device 10 housing the magnetometer. When influenced by the Earth's magnetic field this measurement indicates an absolute geographic direction, in particular, since magnetometers indicate the direction of magnetic North (assuming the device does not experience any other magnetic forces), they can provide a direction to the geographic north by knowing the magnetic declination, which varies with geographical location, is a known value which can be obtained from tables and the like.

Figure 3:
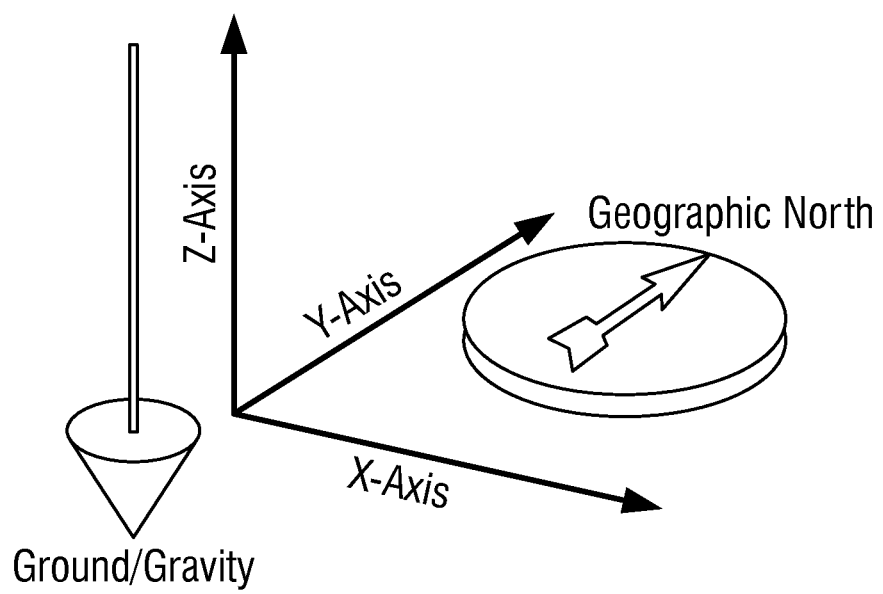
FIG. 3 shows a frame of reference that may be used to express the orientation of the portable electronic device in the Earth coordinate system.

As noted above, the inertial sensors provide motion sensor data in device coordinates. In order to obtain the orientation of the device in the Earth's frame of reference, the motion sensor data is transformed into the Earth coordinate system. One convention that may be used to express the Earth coordinate system is shown in FIG. 3.

Any of a variety of techniques may be used to transform the device frame coordinates to Earth frame coordinates, thereby obtaining the device's orientation in Earth coordinates. For instance, Euler angles, rotation matrices or quaternions may be used. These techniques are well and thus do not need to be discussed in further detail herein.

Each of the aforementioned sensors has their own specific limitations. For instance, as noted above, while the gyroscope responds very rapidly and its signal is low in noise, it does not provide absolute orientation information. Moreover, the output from the gyroscope drifts over time for the reasons mentioned above. Accordingly, if the gyroscope were to be used as the primary or sole source for orientation information, it would need to be provided with an initial absolute orientation and it would need periodic corrections to account for the drift. Also, the gyroscope data may need to undergo filtering with a high pass filter to reduce noise arising from its zero level bias.

One limitation of the accelerometer is that its signal to noise ratio is relatively high and generally will need to undergo low-pass filtering. The same is generally true of the magnetometer as well. Unfortunately, the significant filtering that the accelerometer and magnetometer undergo introduces a time lag and the resulting data obtained from these sensors will trail the gyroscope data when the device rotation is fast.

Thus, because of the aforementioned limitations none of the individual sensors is capable of extracting device orientation data with high precision. One way to overcome this problem is to combine the data from the sensors in a way that uses the advantages of each. The process of combining data from different sensors is often referred to as sensor fusion.

One way to combine the sensor data which will be described below is to use the heavily filtered data from the accelerometer and possibly the magnetometer to obtain the initial absolute orientation of the device and then incrementally update this data using the gyroscope data. This approach is advantageous because of the relatively fast response of the gyroscope. However, because of the drift in the gyroscope data, data from the accelerometer and possibly the magnetometer can be periodically used to correct for the drift in the gyroscope data. Because the accelerometer and magnetometer data is only used for periodic corrections, the lag in this data is of less concern. The rate at which the periodic corrections are applied to the gyroscope data may or may not be the same as the gyroscope data rate. That is, if the gyroscope data is obtained at a series of successive times, the periodic corrections may be applied at each of those times or a subset of those successive periods of time.

Corrections to the gyroscope data may be performed using various sensor fusion techniques such as a Kalman filter or feedback control mechanisms. For instance, a proportional-integral-derivative (PID) feedback control mechanism may be employed. In this approach the angular orientation estimation performed by integrating the angular velocity data from the gyroscope is corrected by using a proportional and integral feedback of the accelerator data and optionally the magnetometer data. The proportional response or function depends only on the current error, which is the difference between the device orientation determined from the angular velocity data from the gyroscope and the device orientation determined from the accelerometer and magnetometer. The integral response or function, on the other hand, depends on the accumulated errors that have developed over time. In some cases the derivative response may not be used because this response can be very sensitive to noise or a slow system response.

In the present context the integral response aims at correcting constant errors such as the gyroscope bias. The proportional response or function will generally provide the primary correction, with the integral response providing a smaller correction. If the gyroscope bias can be eliminated in another way, then in some cases the integral response or function may even be eliminated, since it can cause the corrected gyroscope data to overshoot its desired value.

One problem that arises when the gyroscope is used as the primary source of instantaneous orientation data is that the data can be temporarily lost and thus a way is needed to recover from such losses. The loss of a continuous stream of gyroscope data may occur for any of a variety of different reasons. For instance, data may be lost when the gyroscope saturates (i.e., when the device rotates faster than its maximum measurable rate along one of its axes), when the realtime behavior of the system is overloaded for too long a time and when the gyroscope is temporarily turned off to save power when no output is needed or when power is being used for other device functions such as establishing a telephone call or sending a message.

When gyroscope data is lost, or after a certain time has lapsed without receipt of gyroscope data, the proportional response can be increased for a short period of time so that it responds more quickly. In this way the orientation can be primarily tracked using the accelerometer and magnetometer. In addition, the integral response may be completely suppressed since long term corrections are not of concern during the period when gyroscope data is unavailable. This mode of operation may be referred to as the fast correction mode of the feedback control system. After the gyroscope data once again becomes available, the control system migrates back to its nominal values. The feedback control system may enter and exit the fast correction mode quite rapidly, with a ramp up and decay time greater than linearity. For instance, the ramp up and decay rates may be hyperbolic. In some cases, however, the migration back to the nominal integral response may occur more gradually than the return to the nominal proportional response.

The use of accelerometer data as an input providing periodic error correction to the gyroscope data has a number of limitations that can be addressed. For example, as mentioned above, the accelerometer measures the sum of the linear acceleration in device coordinates and gravity. The resulting device acceleration vector will thus have a downward component due to gravity which is not easily separated from the non-gravitational component of the acceleration vector. That is, a device accelerating in a purely horizontal direction will have an acceleration vector tilted downward because of gravity. Accordingly, the accelerometer is primarily useful to determine the orientation of the device when the device is not accelerating and can be used to determine the orientation of the device by measuring the gravity vector alone.

Assuming the accelerometer is properly calibrated, it can provide an output value very close 1 g (the acceleration due to gravity) when the device is not undergoing any linear acceleration. If its output value is substantially different from 1 g, the device is clearly undergoing linear acceleration in addition to gravity. Accordingly, in some implementations, the data from the accelerometer is only used as feedback to correct the gyroscope data when its output value is close to 1 g (e.g., within +/− of some tolerance value after the acceleration data is filtered). Otherwise, if the accelerometer indicates a value substantially different from gravity, its data is not used as a correction factor to the gyroscope data until it returns to a value near 1 g.

As mentioned above, another problem with the data from the accelerometer is that it needs to undergo low-pass filtering to remove noise, and as a result, the accelerometer data may trail the gyroscope data. The amount by which the accelerometer data lags behind the gyroscope data depends on the amount of filtering that is performed; the more the data is filtered the greater the lag (and vice versa). This problem can be addressed by varying the amount of filtering that is performed on the accelerometer data based on the data from the gyroscope. Specifically, the faster the device rotation as measured by the gyroscope, the more the lag should be reduced. Thus, as the device rotation increases it may be desirable to reduce the amount of filtering performed on the accelerometer data in order to reduce the lag. Likewise, as the device rotation decreases the amount of filtering performed on the accelerometer data can be increased since more lag can be tolerated. The variation in the degree of filtering may be adjusted in a continuous manner based on the rate of rotation of the device or it may be adjusted in one or more discrete increments. For example, one or more thresholds may be established such that if the rate of rotation increases above a certain specified threshold the amount of filtering decreases and if the rate of rotation decreases below that threshold the amount of filtering increases.

Figure 4:
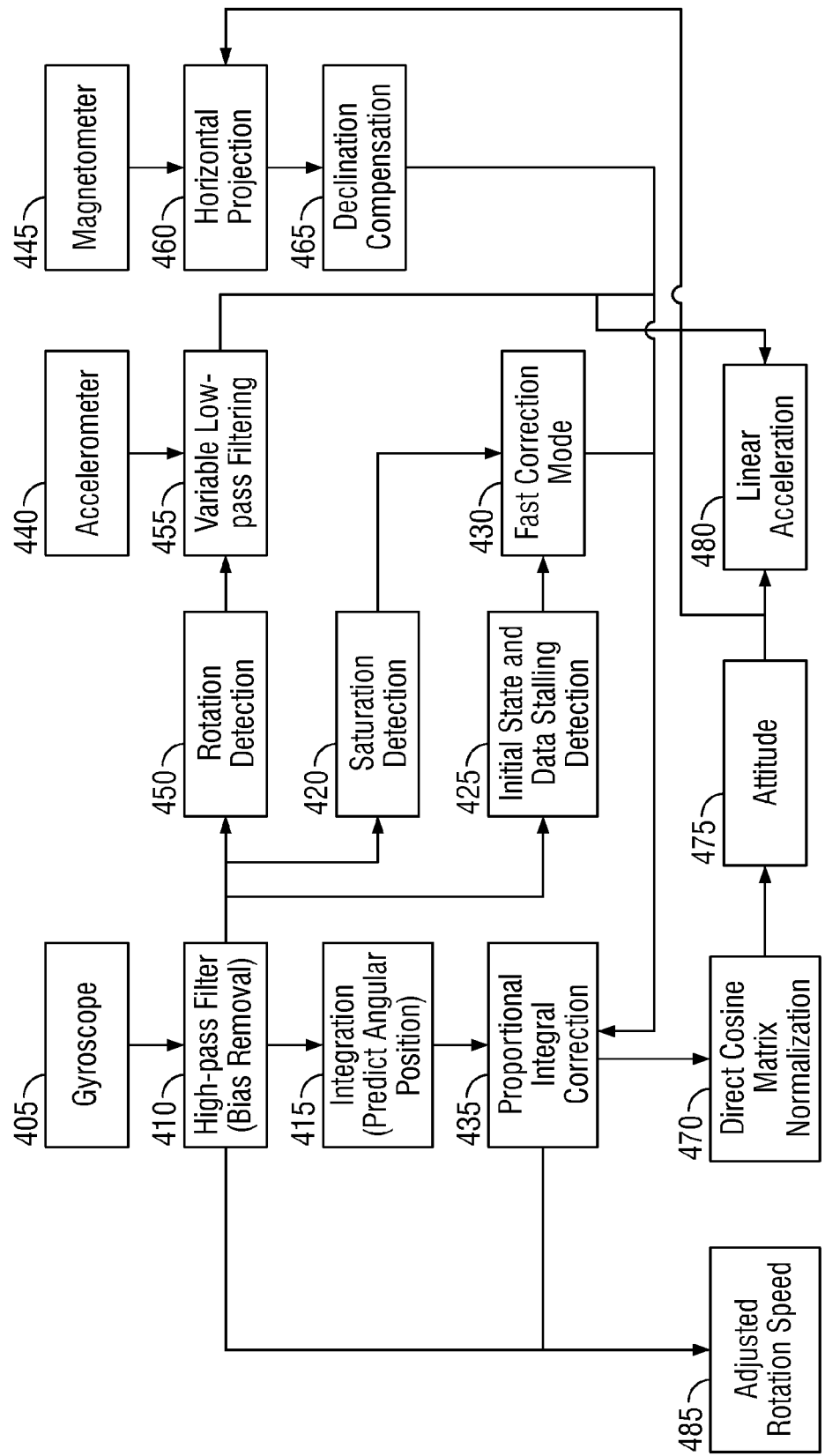
FIG. 4 is a flowchart showing one example of a method for determining the orientation of a portable electronic device using data obtained from two or more sensors located on the device.

FIG. 4 is flowchart showing one example of a method for determining the orientation of a portable electronic device using data obtained from two or more sensors located on the device. In this example three such sensors are used: a gyroscope, an accelerometer, and a magnetometer.

The method begins at step 405 when a processor (e.g., processor 120 in the device of FIG. 2) receives relative rotational data from the gyroscope. This data is sufficient to determine the relative orientation of the device. The gyroscope data is filtered with a high pass filter at step 410 to remove any bias values that may arise from such things as calibration errors, age, temperature and the like. The filtered gyroscope data is integrated at step 415 to obtain the relative orientation of the device.

For the reasons previously discussed, the gyroscope data needs to be initialized to get an absolute orientation of the device. The gyroscope data also needs to be periodically corrected to account for drift and other error. Accordingly, a feedback process is applied at step 435 to the device orientation data obtained in step 415. In this particular example the feedback process is a PID feedback mechanism in which only the proportional and integral responses are employed. The feedback is based on the absolute orientation information obtained from the sensors other than the gyroscope. In this example those sensors are the accelerometer and magnetometer and the data from each is obtained, at steps 440 and 445, respectively.

However, if after filtering the gyroscope data it is determined at steps 420 or 425 that the gyroscope data is invalid or unavailable, respectively, the processor enters a fast correction mode at step 430. More specifically, step 420 determines if the gyroscope is saturated or within a threshold amount of being saturated, in which case the device is rotating at too great a rate to be accurately measured by the gyroscope. In addition, step 425 determines if the gyroscope data has been unavailable for too long a period of time. This includes delays which are caused by the gyroscope itself or what appears to be a delay due to the initialization of the orientation determination method. If the processor enters the fast correction mode at step 430, the proportional response in the feedback loop is rapidly increased and the integral response is suppressed or deactivated. When the gyroscope data is once again available and deemed valid (e.g., no saturation), the proportional and integral responses migrate back to their nominal values.

Before the raw data obtained from the accelerometer and magnetometer can be used in the feedback process, they may undergo various processing. For instance, in the example of FIG. 4, the accelerometer data obtained at step 455 undergoes a variable low pass filtering process to reduce noise. That is, as discussed above, to reduce the lag between the accelerometer data and the gyroscope data at fast rotational speeds, as the device rotation rate increases as indicated by the gyroscope data, the amount of filtering performed on the accelerometer data is reduced in order to reduce the lag. Likewise, the amount of filtering is increased as the device rotation rate determined by the gyroscope decreases. In FIG. 4, the rate of device rotation determined by the gyroscope is determined at step 450 and provided as input data to the variable pass filtering process at step 455.

Orientation data obtained from the magnetometer at step 445 also undergoes processing before it is used in the feedback process. Since the Earth's magnetic field may be represented as a dipole between the North and South Poles, the magnetic field measured by the magnetometer will have an upward or downward components, depending on the hemisphere in which the magnetometer is located. However, only the horizontal component is pertinent in obtaining the direction of magnetic North. Accordingly, the horizontal projection of the magnetometer data is obtained in step 460 to determine magnetic North. Once magnetic North has been determined then true North can be obtained from this data at step 465 by compensating for the declination, which can be obtained or estimated in any appropriate manner using, for instance, positioning technologies such as a GPS sensor if the device is so equipped, cell tower triangulation or Wi-Fi location systems. If no other source of position data is available, the last known location of the device may be used in some cases.

As shown in FIG. 4, the processed data from the accelerometer and the magnetometer is input to the PID correction process of step 435. In this way the accelerometer and magnetometer data are used to provide a periodic correction to the orientation data obtained from the gyroscope. Next, in step 470, the corrected gyroscope orientation data is used to develop a direction cosine matrix (DCM), which in this example is used as the rotation matrix to express the orientation of the device in Earth coordinates.

The DCM is a 3×3 matrix, where the columns represent unit vectors in the body axes, projected along the reference axes. The element in the ith row and jth column represents the cosine of the angle between the i-axis of the reference frame and j-axis of the body frame. Since the axes are orthogonal to each other, and their norm is to be equal to one, the DCM is an orthonormal matrix. Because of numerical errors, the DCM may gradually violate these orthogonal and normalization constraints. Accordingly, in step 470 the DCM undergoes a normalization process to ensure that it remains a proper rotation matrix. Next, in step 475, the orientation or attitude of the device is directly obtained from the DCM. While in this example the orientation is expressed in terms of a DCM, as previously mentioned the orientation may be expressed in other terms as well, using, for example, an Euler angle representation, a quaternion representation, or other representation.

Finally, once the orientation of the device is known, its linear acceleration can be obtained at step 480 by subtracting the acceleration vector due to gravity from the acceleration vector obtained from the accelerometer and compensated by the gyroscope. In addition, the compensated rotational speed of the device can be obtained at step 485.

In some implementations sensor information may be available only from the accelerometer and magnetometer, but not the gyroscope. In this case orientation data may still be obtained, albeit in a degraded mode. In particular, the gravitational acceleration component may not be able to be separated from the lateral acceleration component in the data obtained from the accelerometer. However, instead of being used simply as a source of long term trend data, the accelerometer and magnetometer data can be used more directly (typically with a small low-pass filter to keep the lag time short) to provide the attitude of the device. The direction of the accelerometer data may simply be assumed to be a result of gravity and therefore is pointed to the ground. Thus, the lateral acceleration may only be based on the norm of the accelerometer readings, not its orientation.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor implementing processing logic, an object, an executable, a thread of execution, a program, and/or a computer. By way of illustration, both an application running on a controller and the controller can be a component. One or more components may reside within a process and/or thread of execution and a component may be localized on one computer and/or distributed, between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for determining an orientation of a portable electronic device, comprising:
   sensing a rotational rate of the device using a first rotational sensor;
   sensing a total acceleration including a gravitational component and linear acceleration component of the device using a first inertial sensor;
   filtering data obtained by the first inertial sensor using a variable low pass filter which filters the data by an amount that depends at least in part on the sensed rotational rate of the device;
   deriving an orientation of the device at successive periods of time based in part on the rotational rate sensed during each period of time; and
   applying a correction factor to the derived orientation of the device based at least in part on the sensed gravitational component and the linear acceleration component of the filtered data obtained by the first inertial sensor only subsequent to satisfaction of a specified condition, the condition being satisfied when the first inertial sensor senses a value for the total acceleration that is equal to the gravitational component within a predefined threshold to obtain a corrected orientation of the device at a subset of the successive periods of time,
   wherein applying the correction factor includes adjusting the derived orientation in response to a feedback control signal from the first inertial sensor to obtain the corrected orientation of the device.

2. The method of claim 1 further comprising reducing the amount of filtering performed on the data obtained by the first inertial sensor while the sensed rotational rate of the device increases.

3. The method of claim 1 in which the corrected orientation of the device is obtained in body coordinates associated with the device and further comprising transforming the corrected orientation of the device in body coordinates to Earth coordinates.

4. The method of claim 1 in which the feedback control signal is generated in a feedback control process that includes a proportional function and an integral function.

5. The method of claim 1 further comprising entering a fast correction mode of a feedback control process generating the feedback control signal when valid data from the first inertial sensor is unavailable, the feedback control process in said fast correction mode having a faster proportional response relative to a nominal proportional response used when valid data from the first inertial sensor is available.

6. The method of claim 5 in which the fast correction mode is entered and exited at a rate greater than a linear rate.

7. The method of claim 6 in which the rate greater than the linear rate is a hyperbolic rate.

8. The method of claim 1 further comprising determining a geographic direction using a magnetometer, wherein applying the correction factor is further based on the geographic direction that is determined.

9. The method of claim 8 further comprising initializing the determination of the orientation of the device using absolute orientation information obtained from the first inertial sensor and the magnetometer.

10. A portable electronic device, comprising:
at least first and second inertial sensors for sensing motion of the device, the first inertial sensor providing motion data of a first type and the second inertial sensor providing motion data of a second type different from the first type;
one or more processors for executing computer-executable instructions; and
one or more computer-readable storage media for storing the computer-executable instructions, the instructions when executed by the one more processors implementing processing logic that, based on motion data derived from the first inertial sensor in response to physical movement of the electronic device, tracks an orientation of the device, said tracked orientation having an error arising in measuring the device orientation with the first inertial sensor, the processing logic periodically reducing the error using a feedback control mechanism in which a feedback control signal of a proportional-integral-derivative (PID) control process uses additional motion data of the second type obtained from the second inertial sensor, wherein, if said processing logic determines that rotational motion data obtained from the first inertial sensor is invalid or unavailable while tracking the orientation of the device, the processing logic suppressing an integral function and causing a proportional function of the PID control process to increase its response rate until the rotational motion data is again available and valid.

11. The portable electronic device of claim 10 in which the first inertial sensor is a gyroscope providing rotational motion data and an orientation derived from the rotational motion is a relative orientation of the device.

12. The portable electronic device of claim 11 in which the processing logic initializes rotational motion using the feedback control signal to obtain an absolute rotation motion of the device.

13. The portable electronic device of claim 10 in which the second inertial sensor is an accelerometer sensing a total acceleration that includes a gravitational component and a linear acceleration component.

14. The portable electronic device of claim 13 further comprising a variable low pass filter which filters data obtained by the second inertial sensor by an amount that depends at least in part on a sensed rotational rate of the device.

15. The portable electronic device of claim 14 wherein the amount of filtering performed on the data obtained by the second inertial sensor is reduced while the sensed rotational rate of the device increases.

16. The portable electronic device of claim 10 in which the processing logic suppresses the integral function and causes the proportional function to increase at a rate greater than a linear rate.

17. A mobile electronic device, comprising:
at least first and second inertial sensors for sensing motion of the device;
one or more processors for executing computer-executable instructions which, when executed by the one or more processors, perform a method comprising the steps of:
determining an orientation of the mobile electronic device using at least the first inertial motion sensor with which the mobile electronic device is equipped;
providing a correction factor to the orientation of the mobile electronic device using a feedback control signal based on motion data obtained from the second inertial motion sensor to reduce drift in motion data obtained from the first inertial sensor, the correction factor only being provided subsequent to satisfaction of a specified condition, the specified condition being satisfied when the second inertial sensor does not sense any linear acceleration of the mobile electronic device such that the second inertial sensor only senses a value for total acceleration that is equal to a gravitational component within a predefined threshold;
responsive to a loss of valid motion data from the first inertial motion sensor, increasing a rate at which the correction factor is provided to the orientation of the mobile electronic device.

18. The mobile electronic device of claim 17 in which the first inertial motion sensor is a gyroscope detecting rotational motion of the device and the second inertial motion sensor is an accelerometer sensing a total acceleration that includes a gravitational component and a linear acceleration component, said correction factor being provided to the orientation of the mobile electronic device when the accelerometer senses a total acceleration equal to the gravitational component within a predefined threshold.

19. The mobile electronic device of claim 17 in which the second inertial motion sensor is an accelerometer further comprising filtering motion data obtained by the accelerometer using a variable low pass filter which filters the motion data obtained by the accelerometer by an amount that depends at least in part on a sensed rotational rate of the device.

* * * * *